United States Patent Office 3,703,490
Patented Nov. 21, 1972

3,703,490
DICYCLOPENTADIENE DIEPOXIDE AS A THERMAL STABILIZER FOR POLY(VINYL CHLORIDE)
Harold R. Hersh and Richard W. Sauer, Cherry Hill, N.J., assignors to Atlantic Richfield Company, New York, N.Y.
No Drawing. Filed Mar. 1, 1971, Ser. No. 119,918
Int. Cl. C08f 45/62
U.S. Cl. 260—23 XA          2 Claims

ABSTRACT OF THE DISCLOSURE

Thermal stabilization of polyvinyl chloride utilizing metal salts can be improved when cycloaliphatic epoxides are utilized for a synergistic stabilizing effect.

BACKGROUND OF THE INVENTION

Polyvinyl chloride is an extremely versatile polymer because of the different types of properties it can have when modified with other ingredients. It is possible to produce end products with such varied uses as rigid sheets for construction purposes or soft leathercloth as a furnishing fabric. The main disadvantage with polyvinyl chloride (PVC) is that at the temperatures required to process it into a useful end product, it is unstable.

Unstabilized polyvinyl chloride undergoes degradative changes when exposed to heat, light, or oxygen or combinations thereof. The degradation of PVC could be represented schematically as follows:

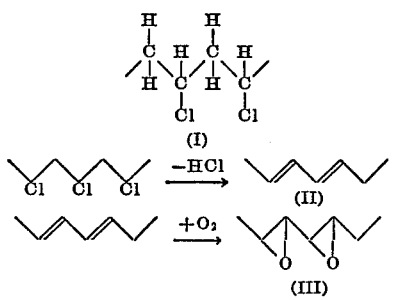

Polyvinyl chloride (I) exposed to heat and light decomposes by releasing hydrogen chloride gas. This in turn leads to formation of double bonds in the molecules (II). The secondary action of oxygen results in compounds to Type III. Compounds of Type III show as general degradation in physical properties manifested by severe softening or by brittleness depending on the plasticizer used. The degradation also changes the appearance of the product. Degradation by heat results in discoloration, while degradation by light leads to yellowing of unplasticized PVC and to spot formation with plasticized products. Since polyvinyl chloride has to be protected from heat and light degradation and the secondary oxidization of the double bonds formed in the degradation steps, the ideal stabilizer should fulfill the following functions:

(1) Thermal stabilization
(2) Photostabilization
(3) Antioxidant action

It has been pointed out in the art that no one stabilizer fulfills all of the requirements to produce the different end products due to the varied process conditions under which the products are manufactured. Consequently, there are at least 400 known stabilizers which are commercially available from which to choose. Generally, they can be grouped as follows:

(1) Stabilizers based on lead
(2) Stabilizers based on barium, cadmium, calcium, and and zinc compounds. This group also includes the use of phosphates and epoxides as co-stabilizers.
(3) Organotin stabilizers The stabilizers of the second group have shown the biggest increase in use in recent years and the present invention is directed to an improvement in the selection of an epoxy compound used in conjunction with the barium/cadmium stabilizers which results in improved thermal stabilization.

THE INVENTION

While the stabilizing action of epoxides, when used as a sole stabilizer, is quite small, it has been shown that epoxides have an important synergistic effect when used in conjunction with other stabilizers. We have found that a stable product with less discoloration than heretofore obtained by using epoxides as secondary stabilizers can be obtained by using cycloaliphatic epoxides having up to 30 carbon atoms, preferably 8 to 21 carbon atoms, and particularly, dicyclopentadiene, as the secondary stabilizer in conjunction with metal salts. These cycloaliphatic epoxides are synergistic with the metal salts in all proportions and can be used in an amount from 5 to 95 percent, preferably 5 to 45 percent, on a weight basis in the stabilizer system. We particuluarly prefer to use the metal salts of fatty acids. Tests have been run comparing the use of cycloaliphatic epoxides and metal salts in comparison with other stabilizers including epoxidized soybean oil and other recognized epoxide stabilizer systems. The results consistently showed that there is less discoloration when the cycloaliphatic epoxide is used. While dicyclopentadiene is preferred, other epoxides such as vinyl cyclohexene diepoxide, alicyclic diepoxy adipate, dipentene diepoxide, 3,4-epoxy cyclohexylmethyl-3,4-epoxy cyclohexane carboxylate and bis-2,3-epoxy cyclopentyl ether will yield improved results over presently recognized stabilizer systems. The following examples depict the improvement of PVC which can be obtained utilizing the stabilizer of our invention.

EXAMPLES 1, 2 AND 3

We have tested dicyclopentadiene diepoxide (DCPDO) as a stabilizer for PVC and followed its performance on a Braebender Plasticorder at 340° F. and 50 r.p.m.; i.e., the work required to maintain a constant rotational speed at a given temperature. These examples show that a rigid PVC formulation using DCPDO has approximately the same rheological pattern (torque v. time) and the same torque levels as can be obtained using a conventional rigid PVC stabilizer system. The system containing no stabilizer (Example 3) showed markedly lower torque levels than either stabilized system as time of test increased; indicating greater degradation of the non-stabilized system. The only variation was in color. The standard system had a gray tint (in thick sections) while the system using DCPDO had an amber color. The systems using no stabilizer had a dark amber color. The formulations were:

| Component, parts by weight | Example No. | | |
|---|---|---|---|
| | 1 Standard | 2 DCPDO | 3 No stabilizer |
| Commercial PVC resin with average specific viscosity of 1.1 and bulk density 35#/cu. ft. | 100 | 100 | 100 |
| Dioctyl phthalate | 10 | 10 | 10 |
| Commercial hydroxy amide castor oil wax having a M.P.-219° F., primarily the monethanolamide of hydroxystearic acid | 1 | 1 | 1 |
| Stearic acid | 0.75 | 0.75 | 0.75 |
| Barium/cadmium laurate | 3 | 0 | 0 |
| Triphenylphosphite | 1 | 0 | 0 |
| Dicyclopentadiene diepoxide | 0 | 4 | 0 |

EXAMPLES 4–8

Mill stability tests on the following formulations were conducted on a two roll mill at 25 r.p.m., 340° F. Samples were taken at 5 minute intervals for color comparison.

| Component, parts by weight | Formulation | | | | |
|---|---|---|---|---|---|
| | 4 | 5 | 6 | 7 | 8 |
| Commercial PVC resin with average specific viscosity of 1.1 and bulk density 35#/cu. ft. | 100 | 100 | 100 | 100 | 100 |
| Dioctyl phthalate | 10 | 10 | 10 | 10 | 10 |
| Hydrogenated pure castor oil; principally glyceryl-tri-12-hydroxystearate | 1 | 1 | 1 | 1 | 1 |
| Stearic acid | 0.75 | 0.75 | 0.75 | 0.75 | 0.75 |
| Barium/cadmium laurate | 3 | 0 | 0 | 0 | 3 |
| Triphenyl phosphite | 1 | 0 | 0 | 0 | 0 |
| Dicyclopentadiene diepoxide | 0 | 0 | 4 | 3 | 1 |

The results of the mill tests showed the following:

Example 4: (Recognized commercial stabilizer) grayish tint darkening with residence time on the mill. The five minute samples had fairly smooth surfaces—this persisted for all samples up to one hour's residence time.

Example 5: (No stabilizer) dark amber color—rough surfaces almost immediately.

Example 6: (Dicyclopentadiene diepoxide) light amber color—slowly darkening—rough surfaces appearing in 15 minutes.

Example 7: (Dicyclopentadiene diepoxide) very light color—slight amber tint—smooth surfaces over an hour's duration.

Example 8: (Dicyclopentadiene diepoxide) very light light color—slight amber tint—smooth surfaces over an hour's duration.

EXAMPLES 9–15

In order to evaluate the use of cycloaliphatic epoxides as secondary stabilizers for PVC resins as compared to recognized epoxy stabilizers, mill stability tests were conducted with commercially available epoxidized soybean oil (ESO) and DCPDO in stabilizer systems for rigid PVC.

The three different synergistic systems were:
(1) DCPDO or ESO with Ba/Cd laurate
(2) DCPDO or ESO with Ba/Cd laurate and a zinc salt of a fatty acid
(3) DCPDO or ESO with Ba/Cd laurate, a zinc salt of a fatty acid and an organic phosphite chelator.

Constituents for the formulations are given in parts by weight and it is noted that additional plasticizer was added to the DCPDO formulations to compensate for the contributions of the soybean oil. Example 15 was without either stabilizer and served as a standard.

| Constituents | Example No. | | | | | | |
|---|---|---|---|---|---|---|---|
| | 9 Ba/Cd | 10 Ba/Cd | 11 Cd/Ba/Zn | 12 Cd/Ba/Zn | 13 Cd/Ba/Zn phosphite | 14 Cd/Ba/Zn phosphite | 15 Standard |
| Commercial PVC w./avg. MW of 90,000 | 200 | 200 | 200 | 200 | 200 | 200 | 200 |
| Stearic acid | 1 | 1 | 1 | 1 | 1 | 1 | 1 |
| Ba/Cd laurate | 2 | 2 | 2 | 2 | 2 | 2 | 6 |
| DCPDO | | 6 | | 6 | | 6 | |
| Epoxidized soybean oil (ESO) | 6 | | 6 | | 6 | | |
| Dioctyl phthalate | 10 | 16 | 10 | 16 | 10 | 16 | 16 |
| Zinc salt of fatty acid | | | 1 | 1 | 1 | 1 | |
| Triphenylphosphite | | | | | 1 | 1 | 2 |

RESULTS OF TESTS

| Run | Color | Transparency |
|---|---|---|
| 9. (ESO) | Very slightly darker than standard | Slight haze. |
| 10. (DCPDO) | do | Transparent. |
| 11. (ESO) | Same as standard | Slight haze. |
| 12. (DCPDO) | do | Transparent. |
| 13. (ESO) | Slightly lighter than standard | Slight haze. |
| 14. (DCPDO) | do | Transparent. |
| 15. Standard | Light | Hazy—opaque. |

In general, both ESO and DCPDO stabilizer systems gave equivalent to better performance than the standard when formulated with organic zinc salts and an organic phosphite chelator. The ESO and DCPDO gave indistinguishable coloration difference; however, DCPDO stabilized systems gave better clarity in all stabilizer variations.

Similar results can be obtained with other cycloaliphatic type diepoxides such as vinylcyclohexene diepoxide and alicyclic diepoxy adipate.

We claim:
1. Rigid transparent plastics derived predominantly from vinyl chloride formulations stabilized with respect to heat and light by a stabilizer system consisting essentially of 5–95% metal salt compounds of a fatty acid and 5–95% dicyclopentadiene diepoxide; the metals of said salts being selected from the group consisting of barium, cadmium, calcium and zinc.
2. The rigid transparent plastics of claim 1 wherein the dicyclopentadiene diepoxide is present in an amount between 5 and 45 weight percent of the stabilizer system.

References Cited
UNITED STATES PATENTS

| 2,750,395 | 6/1956 | Phillips et al. | 260—45.8 X |
| 2,924,822 | 2/1960 | Mullins et al. | 260—45.8 X |
| 3,066,151 | 11/1962 | Thorn et al. | 260—45.8 X |
| 3,144,422 | 8/1964 | Homberg | 260—23 |

DONALD E. CZAJA, Primary Examiner

D. J. BARRACK, Assistant Examiner

U.S. Cl. X.R.

260—31.8 R, 45.8 A